(12) United States Patent
Hu et al.

(10) Patent No.: US 8,040,367 B2
(45) Date of Patent: Oct. 18, 2011

(54) LIGHTSCRIBE OPTICAL DISC DRIVE

(75) Inventors: Wei-Chieh Hu, Hsinchu (TW); Shih-Ming Hsu, Hsinchu (TW); Ying-Shun Li, Hsinchu (TW); Hao-Wen Chang, Hsinchu (TW); Jung-Fu Chen, Hsinchu (TW); Chun-Jen Tseng, Hsinchu (TW); Chih-Ming Yang, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 408 days.

(21) Appl. No.: 12/369,275

(22) Filed: Feb. 11, 2009

(65) Prior Publication Data
US 2009/0278908 A1 Nov. 12, 2009

(30) Foreign Application Priority Data
May 8, 2008 (CN) .......................... 2008 1 0096289

(51) Int. Cl.
*B41J 2/435* (2006.01)
*G01D 15/14* (2006.01)

(52) U.S. Cl. ...................................................... 347/224
(58) Field of Classification Search .................. 347/224, 347/225, 236, 246; 369/44.11, 93–98
See application file for complete search history.

(56) References Cited

U.S. PATENT DOCUMENTS

| | | | | |
|---|---|---|---|---|
| 6,317,399 | B1 * | 11/2001 | Ohtani et al. | 369/47.44 |
| 7,196,715 | B2 * | 3/2007 | Hanks | 347/224 |
| 7,443,411 | B2 * | 10/2008 | Koll et al. | 347/225 |
| 7,728,864 | B2 * | 6/2010 | Han | 347/251 |

* cited by examiner

*Primary Examiner* — Hai C Pham
(74) *Attorney, Agent, or Firm* — WPAT, PC; Justin King

(57) ABSTRACT

An optical disc drive for marking a label side of a lightscribe disc is provided. The optical disc drive includes a spoke detecting device, a traverse assembly frame, a spindle motor PCB and an insulating base. The spoke detecting device is used for detecting spoke patterns on the lightscribe disc. The spindle motor PCB is communicated with the spoke detecting device through a flexible cable. The insulating base is coupled with the frame for supporting the spoke detecting device such that the spoke detecting device is separated from the lightscribe disc by a specified gap.

7 Claims, 9 Drawing Sheets

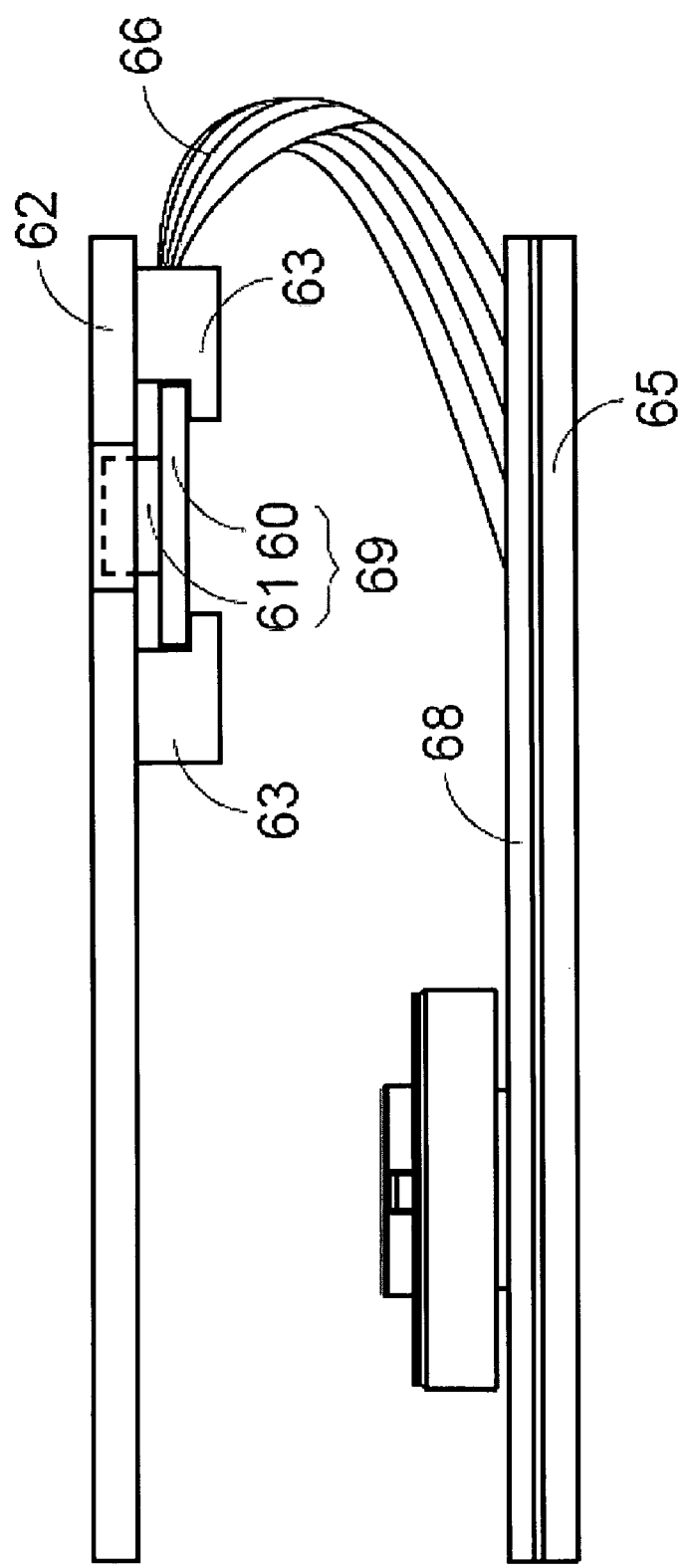

LIGHTSCRIBE OPTICAL DISC DRIVE

FIELD OF THE INVENTION

The present invention relates to an optical disc drive, and more particularly to a lightscribe optical disc drive.

BACKGROUND OF THE INVENTION

An optical disc is used to record data onto a data side thereof with a burner. After the burning operation of a disc is finished, the title or other information may be marked on the label side of the optical disc. For combining text and graphics in simple or complex labels that reflect one's personality and attitude, a lightscribe optical disc drive has been disclosed. Lightscribe is an optical disc recording technology that utilizes specially coated recordable CD and DVD media to produce laser-etched labels with text or graphics. The label side of a lightscribe disc is coated with a specific light-sensitive dye that becomes darkened when exposed to the laser light emitted by an optical pickup head. By creating the desired text or graphics with a graphics program, the laser light burns the label pattern onto the label side.

FIG. 1 schematically illustrates the central part of a typical lightscribe disc. The optical disc has an annular reference region 13 previously provided with a certain pattern. The annular reference region 13 includes an outer ring and an inner ring. The inner ring is provided with a uniform pattern, i.e. alternate dark and bright spokes, for rotation control while marking the label side. In general, the information of the outer ring is accessed by the optical pickup head (not shown), while the information of the inner ring is realized by a spoke detector 12.

In accordance with the specifications of the lightscribe optical disc drive, the spoke detector should be separated from the lightscribe disc by a specified gap (e.g. 1.5 mm). In the conventional lightscribe optical disc drive, a spacer with electrical wires is attached on a spindle motor PCB (printed circuit board) and then the spoke detector is mounted on the spacer. By means of the spacer, the spoke detector is separated from the lightscribe disc by the specified gap. In addition, the spoke detector is electrically connected to the spindle motor PCB through the spacer.

FIG. 2 is a schematic side view illustrating a spoke detector used in a conventional lightscribe optical disc drive. As shown in FIG. 2, a spindle motor PCB 11 is supported on a metallic plate 9. A spindle motor 16 is mounted on the spindle motor PCB 11 for rotating a lightscribe disc 15. A spacer 10 is also mounted on the spindle motor PCB 11. A spoke detector 12 is disposed on the spacer 10 for detecting certain patterns 13 on the inner ring of the lightscribe disc 15. Several electrical wires 14 are also disposed on the spacer 10. After the spoke detector 12 is placed over the spacer 10, the spoke detector 12 is contacted with the electrical wires 14 on the spacer 10. The electrical wires 14 are extended from the main body of the spacer 10 and coupled with signal lines or power lines on the spindle motor PCB 11 by soldering means, for example. Via the electrical wires 14, the spoke detector 12 is communicated with and electrically connected to the spindle motor PCB 11.

FIG. 3 is a schematic top view illustrating a traverse assembly inside the lightscribe optical disc drive. The traverse assembly 100 has an optical pickup head 18 thereon. The optical pickup head 18 is supported by the guide rods 17 on bilateral sides thereof. For reading/writing the lightscribe disc 15 as described in FIG. 2, the optical pickup head 18 is driven by a stepping motor (not shown) to move along the guide rods 17 in the direction as indicated by the arrow. Moreover, after the spoke detector 12 is inserted into a perforation 20 in a frame 19 of the traverse assembly 100, the traverse assembly 100 is combined with the spindle motor PCB 11. A top view of the assembled traverse assembly 100 is illustrated in FIG. 4. Meanwhile, the spoke detector 12 may detect certain patterns 13 on the inner ring of the lightscribe disc 15.

FIG. 5 is a schematic partial side view of the lightscribe optical disc drive after a lightscribe disc is loaded. As shown in FIG. 5, by using the spacer 10 to raise the spoke detector 12, the spoke detector 12 is separated from the lightscribe disc 15 by a specified gap 21 in order to comply with the specifications of the lightscribe optical disc drive. When the lightscribe disc 15 is rotated by the spindle motor 16, the certain patterns 13 on the inner ring of the lightscribe disc 15 is continuously detected by the spoke detector 12 and thus the spoke detector 12 issues corresponding spoke signals. The spoke signals are transmitted to the spindle motor PCB 11 through the electrical wires 14 on the spacer 10 for rotation control.

As previously described, the spacer 10 is used for raising the spoke detector 12 such that the spoke detector 12 is separated from the lightscribe disc 15 by a specified gap. Since the spoke detector 12 is communicated with the spindle motor PCB 11 through the wires 14 in the spacer 10, the configurations and the fabricating process of the spacer 10 are very complicated and the spacer 10 is not cost-effective.

Therefore, there is a need of providing an improved lightscribe optical disc drive to obviate the drawbacks encountered from the prior art.

SUMMARY OF THE INVENTION

The present invention provides a lightscribe optical disc drive having a specific component to replace the spacer so as to simplify the assembling process and reduce the fabricating cost.

In accordance with an aspect of the present invention, there is provided an optical disc drive for marking a label side of a lightscribe disc. The optical disc drive includes a spoke detecting device for detecting spoke patterns on the lightscribe disc, a frame for a traverse assembly, a spindle motor PCB communicated with the spoke detecting device through a flexible cable, and an insulating base coupled with the frame for supporting the spoke detecting device such that the spoke detecting device is separated from the lightscribe disc by a specified gap.

In accordance with another aspect of the present invention, there is provided an optical disc drive for marking a label side of a lightscribe disc. The optical disc drive includes a spoke detecting device for detecting spoke patterns on the lightscribe disc, a spindle motor PCB communicated with the spoke detecting device through a flexible cable, and an insulating pad coupled with the spindle motor PCB for supporting the spoke detecting device such that the spoke detecting device is separated from the lightscribe disc by a specified gap.

In accordance with another aspect of the present invention, there is provided an optical disc drive for marking a label side of a lightscribe disc. The optical disc drive includes a metallic plate, a spindle motor PCB supported on the metallic plate and having a notch such that a receptacle is defined by sidewalls of the notch and a surface of the metallic plate, and a spoke detecting device for detecting spoke patterns on the lightscribe disc. The spoke detecting device is received in the receptacle such that the spoke detecting device is separated from the lightscribe disc by a specified gap.

BRIEF DESCRIPTION OF THE DRAWINGS

The above contents of the present invention will become more readily apparent to those ordinarily skilled in the art after reviewing the following detailed description and accompanying drawings, in which:

FIG. 6E is a schematic side view illustrating the resulting structure of the lightscribe optical disc drive according to the first preferred embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a lightscribe optical disc drive. In a first embodiment, the lightscribe optical disc drive of the present invention principally comprises a spoke detecting device, a traverse assembly frame, a spindle motor PCB and an insulating base. The spoke detecting device is used for detecting certain spoke patterns on a lightscribe disc. The spindle motor PCB is communicated with and electrically connected with the spoke detecting device through a flexible cable. The spoke detecting device is supported by the insulating base. The insulating base is also coupled with the frame. After the lightscribe disc is loaded in the lightscribe optical disc drive, the spoke detecting device is separated from the lightscribe disc by a specified gap (e.g. 1.5 mm). Hereinafter, a lightscribe optical disc drive according to a first preferred embodiment of the present invention will be illustrated in more details with reference to FIGS. 6A, 6B, 6C, 6D and 6E.

Figure 1:
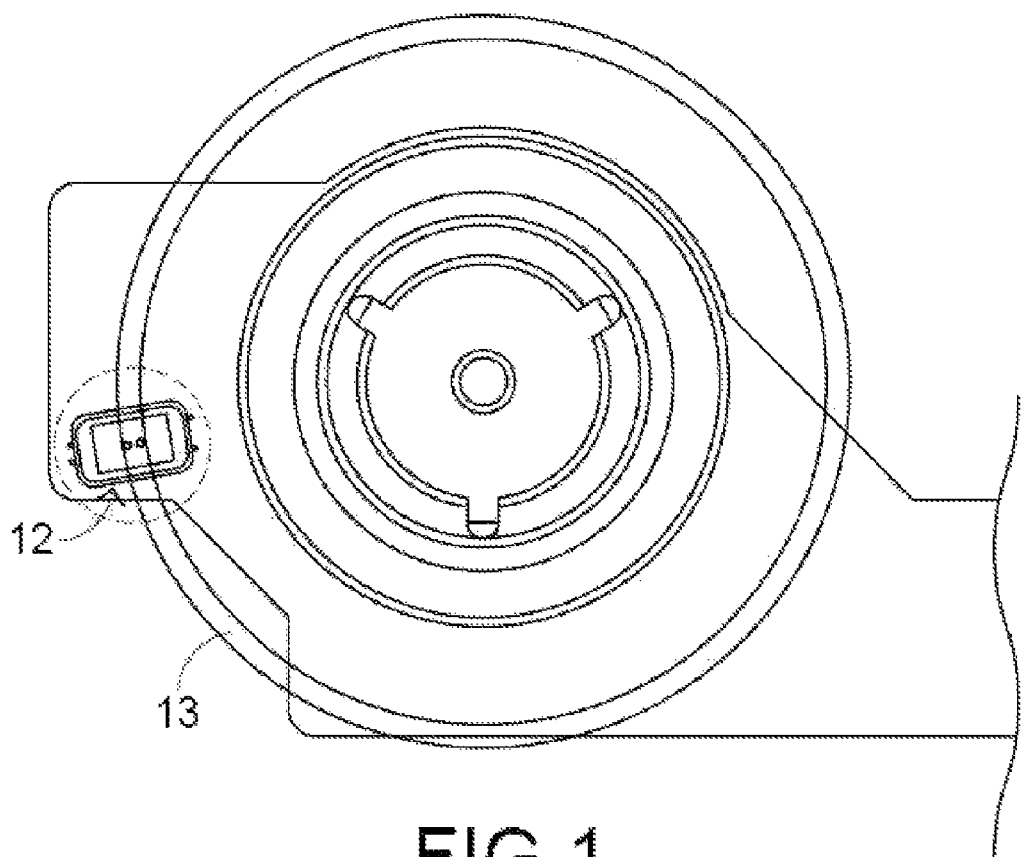
FIG. 1 schematically illustrates the central part of a typical lightscribe disc.
Figure 2:
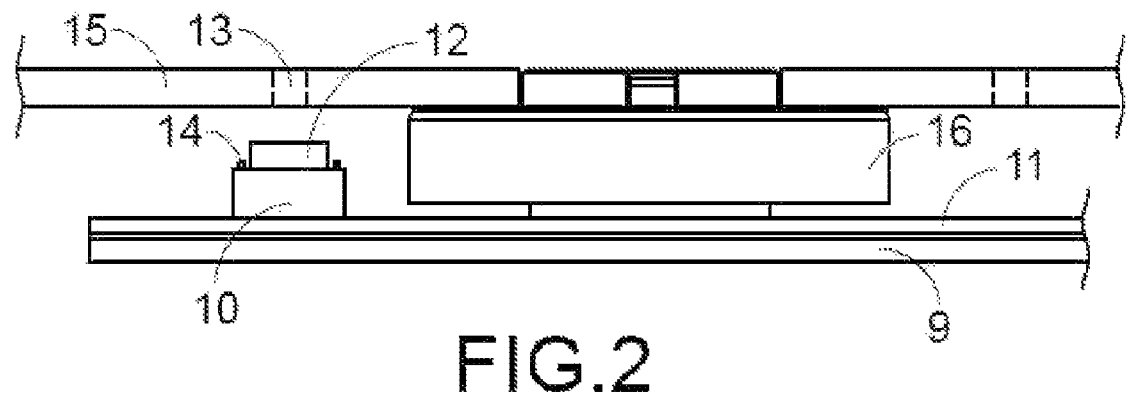
FIG. 2 is a schematic side view of a spoke detector used in a conventional lightscribe optical disc drive.
Figure 3:
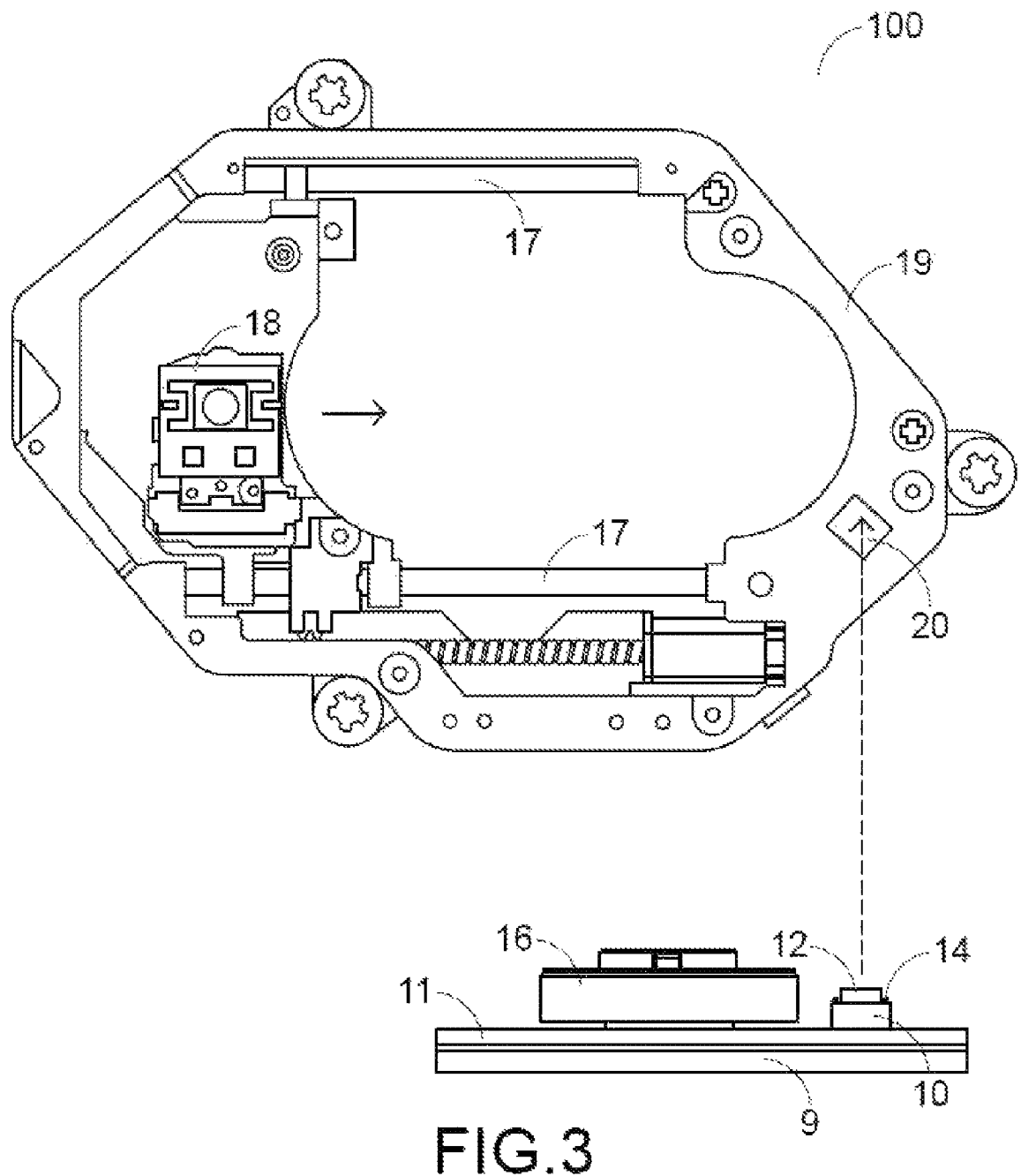
FIG. 3 is a schematic top view illustrating a traverse assembly inside the lightscribe optical disc drive.
Figure 4:
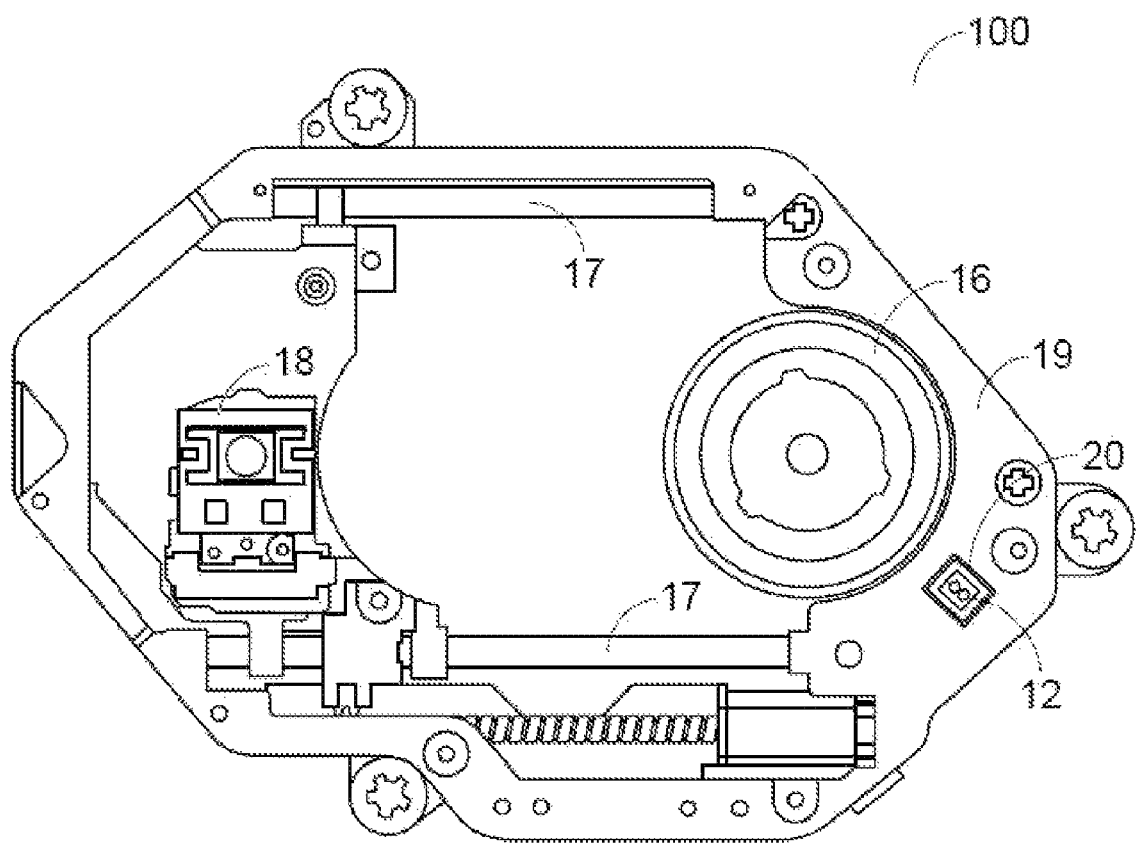
FIG. 4 is a schematic top view of the assembled traverse assembly shown in FIG. 3.
Figure 5:
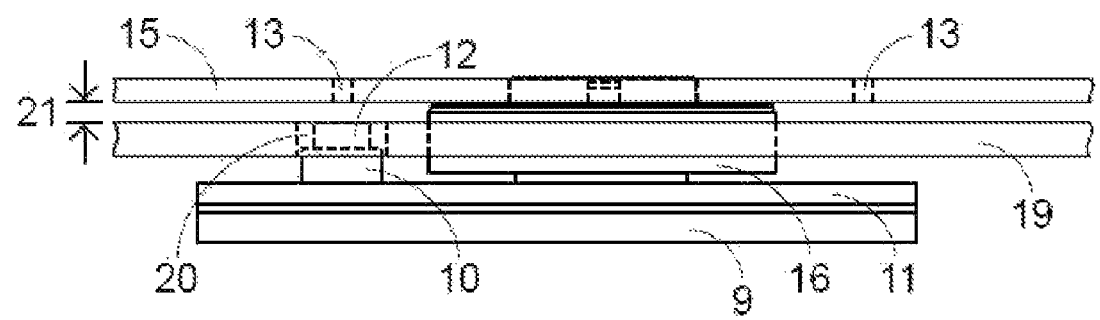
FIG. 5 is a schematic partial side view of the lightscribe optical disc drive after a lightscribe disc is loaded.
Figure 6A:
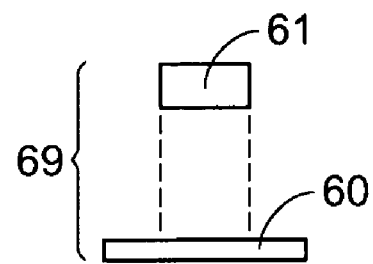
FIG. 6A is a schematic side view illustrating a spoke detecting device used in a lightscribe optical disc drive according to a first preferred embodiment of the present invention.

FIG. 6A is a schematic side view illustrating a spoke detecting device used in a lightscribe optical disc drive according to a first preferred embodiment of the present invention. The spoke detecting device 69 includes a spoke detector 61 and a spoke detector PCB 60. The spoke detector 61 is mounted on the spoke detector PCB 60 according to the surface mounted technology (SMT). The spoke detector 61 has several electrical wires (not shown) welded onto the solder pads on the spoke detector PCB 60, so that the spoke detector 61 is electrically connected to the spoke detector PCB 60.

Figure 6B:
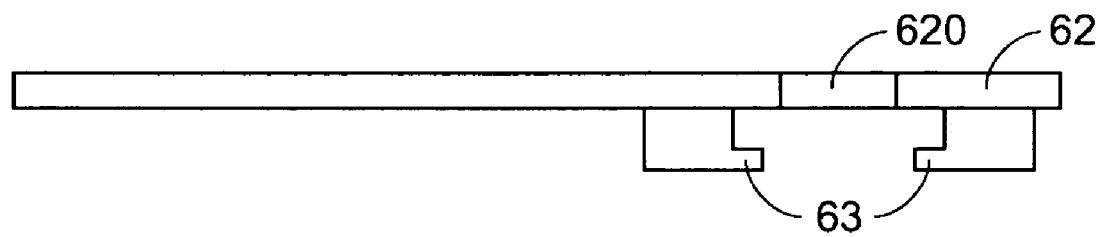
FIG. 6B is a schematic side view illustrating a frame used in the lightscribe optical disc drive according to the first preferred embodiment of the present invention.
Figure 6C:
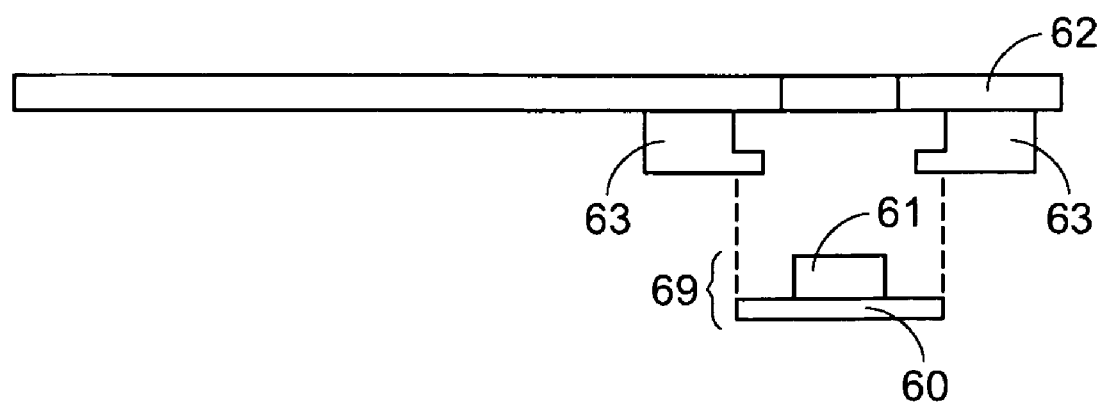
FIG. 6C is a schematic side view illustrating integration of the spoke detecting device with the frame according to the first preferred embodiment of the present invention.
Figure 6D:
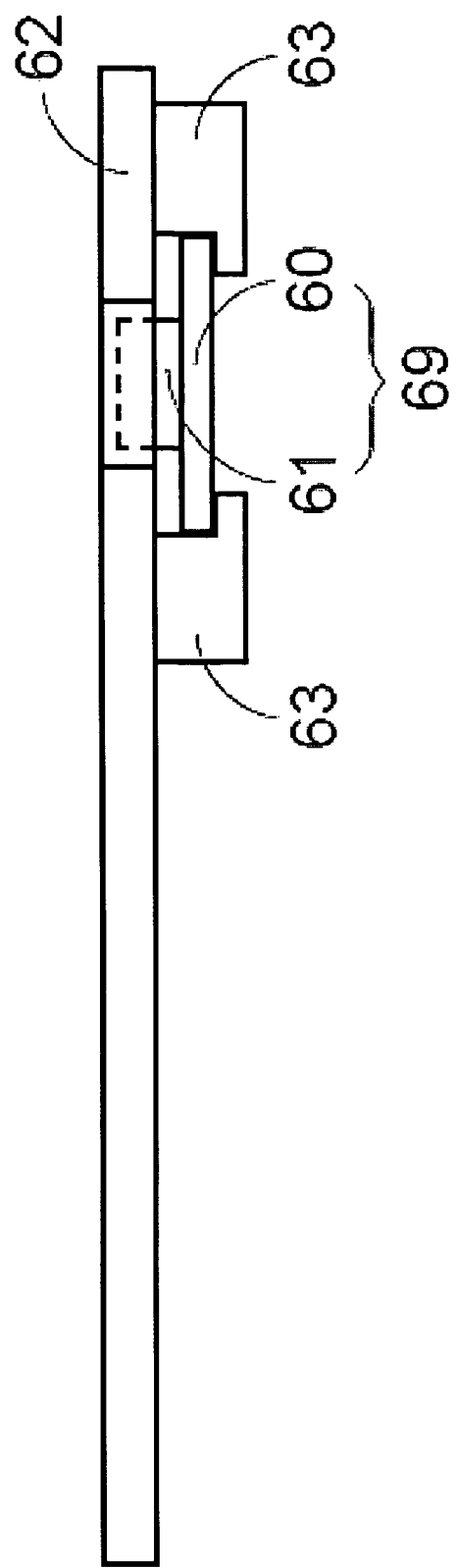
FIG. 6D is a schematic side view illustrating the assembly of the spoke detecting device, the insulating base and the frame according to the first preferred embodiment of the present invention.

FIG. 6B is a schematic side view illustrating a frame used in the lightscribe optical disc drive according to the first preferred embodiment of the present invention. The traverse assembly frame 62 has a perforation 620 corresponding to the spoke detecting device 69. An insulating base 63 is attached on the frame 62 by a plastic injection molding process. Alternatively, the insulating base 63 is attached on the frame 62 by screwing or using adhesive. The insulating base 63 has retaining posts for positioning the spoke detector PCB 60. Several screw holes (not shown) are also formed in the insulating base 63. For integrating the spoke detecting device 69 with the frame 62, as shown in FIG. 6C, the spoke detecting device 69 is received in the receptacle defined between the insulating base 63 and the frame 62. After the spoke detecting device 69 is positioned in the receptacle between the insulating base 63 and the frame 62 and supported by the insulating base 63, corresponding fastening elements (not shown) are screwed in the screw holes so as to fix the spoke detecting device 69 on the insulating base 63. The assembled view of the spoke detecting device 69, the insulating base 63 and the frame 62 is illustrated with reference to FIG. 6D. Next, two ends of a flexible flat cable 66 are coupled with the spoke detecting device 69 and a spindle motor PCB 68, respectively, so that the spoke detecting device 69 is communicated with the spindle motor PCB 68 through the flexible flat cable 66. The integration structure is shown in FIG. 6E. After a lightscribe disc (not shown) is loaded in the lightscribe optical disc drive, the spoke detector 61 is separated from the lightscribe disc by a specified gap (e.g. 1.5 mm).

As previously described in the prior art, a spacer is welded onto the spindle motor PCB and then the spoke detector is mounted on and electrically connected to the spacer, and thus the assembling process is complicated. Whereas, according to the present invention, the spoke detector 61 is fixed on the spoke detector PCB 60 and then the spoke detecting device 69 is electrically connected with the spindle motor PCB 68 through the flexible flat cable 66. Since the spoke detector PCB 60 and the spindle motor PCB 68 are separately fabricated, the assembling process of the present invention is simplified. Moreover, for integrating other components of the lightscribe optical disc drive with the frame 62 according to the present invention, several retaining posts and screw holes may also be formed on the frame 62 by a plastic injection molding process. As a consequence, the assembling process of the present invention is more cost-effective.

A lightscribe optical disc drive according to a second preferred embodiment of the present invention will be illustrated as follows with reference to FIGS. 7A, 7B, 7C, 7D and 7E.

Figure 7A:
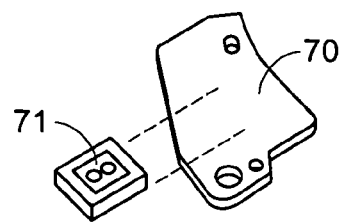
FIG. 7A is a schematic perspective view illustrating a spoke detecting device used in a lightscribe optical disc drive according to a second preferred embodiment of the present invention.

FIG. 7A is a schematic perspective view illustrating a spoke detecting device used in a lightscribe optical disc drive according to a second preferred embodiment of the present invention. The spoke detecting device includes a spoke detector 71 and a spoke detector PCB 70. The spoke detector 71 is mounted on the spoke detector PCB 70 according to the surface mounted technology (SMT). The spoke detector 71 has several electrical wires (not shown) welded onto solder pads on the spoke detector PCB 70, so that the spoke detector 71 is electrically connected to the spoke detector PCB 70.

Figure 7B:
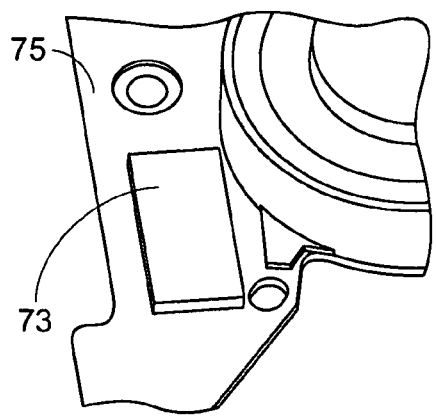
FIG. 7B is a schematic perspective view illustrating a spindle motor PCB used in the lightscribe optical disc drive according to the second preferred embodiment of the present invention.

FIG. 7B is a schematic perspective view illustrating a spindle motor PCB used in the lightscribe optical disc drive according to the second preferred embodiment of the present invention. A plastic pad 73 is attached on the spindle motor PCB 75 by screwing or using adhesive.

Figure 7C:
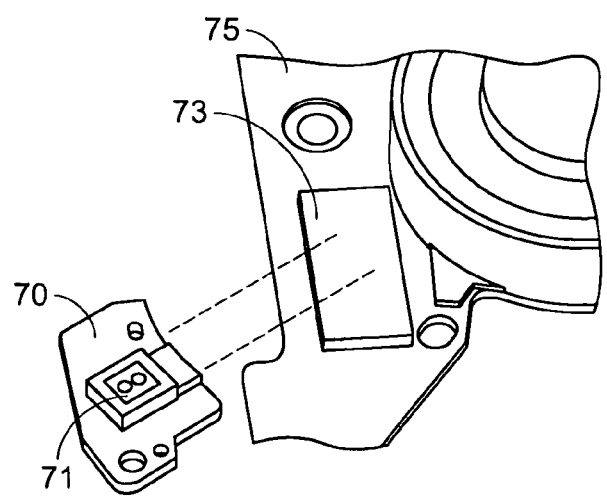
FIG. 7C is a schematic perspective view illustrating integration of the spoke detecting device with the spindle motor PCB according to the second preferred embodiment of the present invention.
Figure 7D:
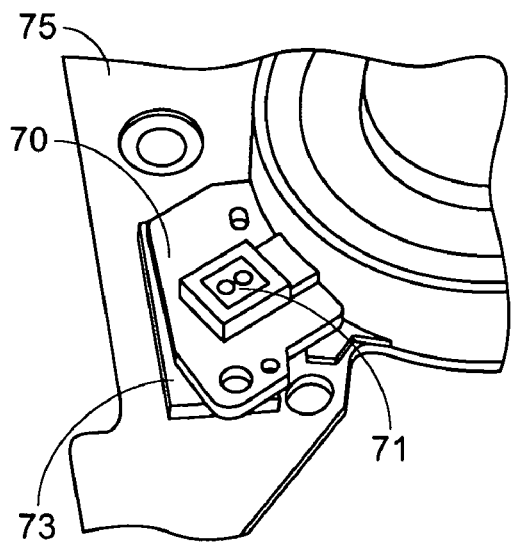
FIG. 7D is a schematic perspective view illustrating the assembly of the spoke detecting device, the plastic pad and the spindle motor PCB according to the second preferred embodiment of the present invention.
Figure 7E:
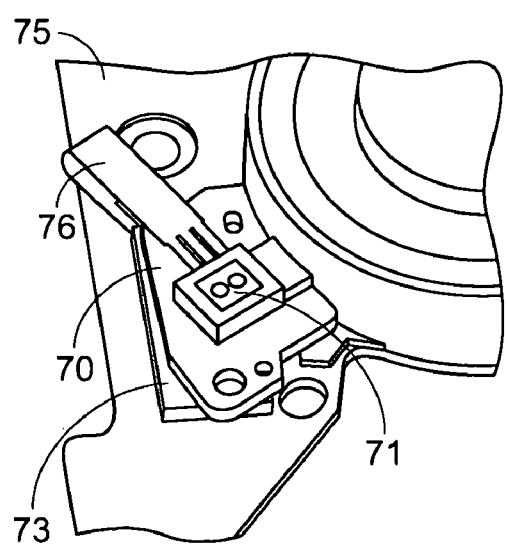
FIG. 7E is a schematic perspective view illustrating the flexible cable connecting the spoke detecting device and the spindle motor PCB according to the second preferred embodiment of the present invention.

For integrating the spoke detecting device with the spindle motor PCB 75, as shown in FIG. 7C, the spoke detecting device is attached on the plastic pad 73 by screwing or using adhesive. The assembled view of the spoke detecting device, the plastic pad 73 and the spindle motor PCB 75 is illustrated with reference to FIG. 7D. Next, two ends of a flexible flat cable 76 are coupled with the spoke detecting device and the spindle motor PCB 75, respectively, so that the spoke detecting device is communicated with the spindle motor PCB 75 through the flexible flat cable 76. The integration structure is shown in FIG. 7E. After a lightscribe disc (not shown) is loaded in the lightscribe optical disc drive, the spoke detecting device is separated from the lightscribe disc by a specified gap (e.g. 1.5 mm).

In the above embodiment, the plastic pad 73 is used for raising the spoke detecting device in replace of the spacer used in the conventional lightscribe optical disc drive such that the spoke detecting device is separated from the lightscribe disc by the specified gap. In comparison with the spacer, the plastic pad 73 is very simple in configurations because no electrical wires are formed on the plastic pad 73. Accordingly, the assembling process of the present invention is more simplified and cost-effective.

A lightscribe optical disc drive according to a third preferred embodiment of the present invention will be illustrated as follows with reference to FIGS. 8A, 8B, 8C and 8D.

Figure 8A:
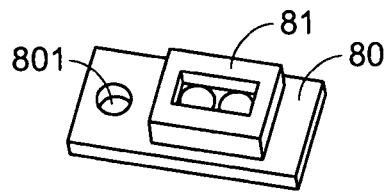
FIG. 8A is a schematic perspective view illustrating a spoke detecting device used in a lightscribe optical disc drive according to a second preferred embodiment of the present invention.

FIG. 8A is a schematic perspective view illustrating a spoke detecting device used in a lightscribe optical disc drive according to a third preferred embodiment of the present invention. The spoke detecting device includes a spoke detector 81 and a spoke detector PCB 80. The spoke detector 81 is mounted on the spoke detector PCB 80 according to the surface mounted technology (SMT). The spoke detector 81 has several electrical wires (not shown) welded onto solder pads on the spoke detector PCB 80, so that the spoke detector 81 is electrically connected to the spoke detector PCB 80. Furthermore, a screw hole 801 is formed in the spoke detector PCB 80.

Figure 8B:
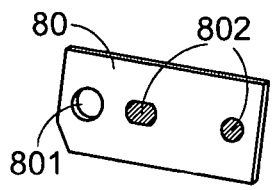
FIG. 8B is a schematic rear view of the spoke detecting device shown in FIG. 8A.

FIG. 8B is a schematic rear view of the spoke detecting device shown in FIG. 8A. As shown in FIG. 8B, one or more first retaining structures 802 are formed on the rear surface of the spoke detector PCB 80.

Figure 8C:
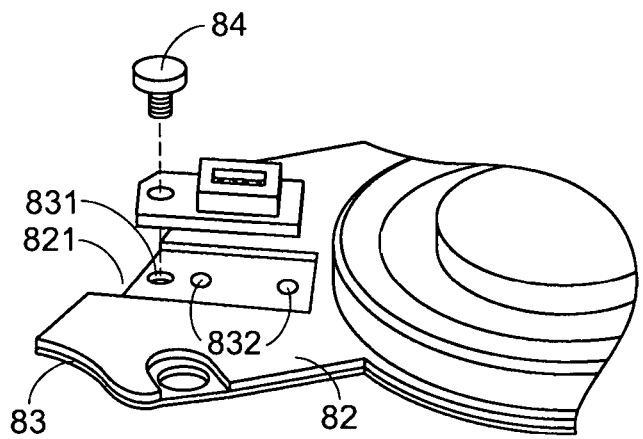
FIG. 8C is a schematic perspective view illustrating a spindle motor PCB used in the lightscribe optical disc drive according to the third preferred embodiment of the present invention.

FIG. 8C is a schematic perspective view illustrating a spindle motor PCB used in the lightscribe optical disc drive according to the third preferred embodiment of the present invention. The spindle motor PCB 82 is supported on a metallic plate 83. The spindle motor PCB 82 has a notch 821 corresponding to the spoke detector PCB 80 such that a receptacle is defined by sidewalls of the notch 821 and the surface of the metallic plate 83. Corresponding to the screw hole 801 of the spoke detector PCB 80, a screw hole 831 is formed in the metallic plate 83. In addition, one or more second retaining structures 832 are formed on the surface of the metallic plate 83. The second retaining structures 832 are complementary to the first retaining structures 802. For example, if the first retaining structures 802 are indentations, the second retaining structures 832 are salient points. Whereas, if the first retaining structures 802 are salient points, the second retaining structures 832 are indentations.

Figure 8D:
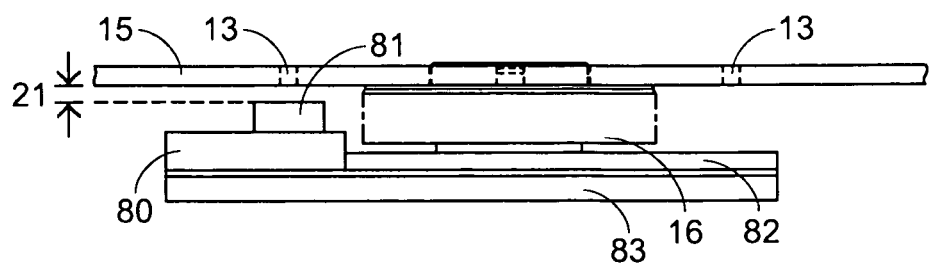
FIG. 8D is a schematic partial side view of the lightscribe optical disc drive according to the third preferred embodiment of the present invention.

For integrating the spoke detecting device with the spindle motor PCB 82, the spoke detecting device is firstly received in the receptacle, in which the screw hole 831 is aligned with the screw hole 801 of the spoke detector PCB 80 and the second retaining structures 832 are engaged with the first retaining structures 802. After the spoke detecting device is positioned in the receptacle, a fastening element 84 is screwed in the screw holes 801 and 831 so as to fix the spoke detecting device on the metallic plate 83. Next, two ends of a flexible flat cable (not shown) are coupled with the spoke detecting device and the spindle motor PCB 82, respectively, so that the spoke detecting device is communicated with the spindle motor PCB 82 through the flexible flat cable. FIG. 8D is a schematic partial side view of the lightscribe optical disc drive. As shown in FIG. 8D, the thickness of the spoke detector PCB 80 is larger than that of the spindle motor PCB 82 such that the spoke detector 81 is raised by the spoke detector PCB 80. Under this circumstance, the spoke detector 81 is separated from the lightscribe disc 15 by the specified gap 21 (e.g. 1.5 mm) in order to comply with the specifications of the lightscribe optical disc drive.

From the above embodiment, the lightscribe optical disc drive has simplified and cost-effective assembling process because the complicated spacer is replaced by the insulating base, the plastic pad or the spoke detector PCB.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical disc drive for marking a label side of a lightscribe disc, the optical disc drive comprising:
    a spoke detecting device for detecting spoke patterns on the lightscribe disc;
    a traverse assembly having a frame;

a spindle motor PCB communicated with the spoke detecting device through a flexible cable; and an insulating base coupled with the frame for supporting the spoke detecting device such that the spoke detecting device is separated from the lightscribe disc by a specified gap.

2. The optical disc drive according to claim 1 wherein the spoke detecting device comprises:

a spoke detector PCB; and a spoke detector mounted on the spoke detector PCB and electrically connected to the spoke detector PCB.

3. The optical disc drive according to claim 2 wherein the spoke detector is mounted on the spoke detector PCB according to the surface mounted technology.

4. The optical disc drive according to claim 1 wherein the insulating base is attached on the frame by a plastic injection molding process.

5. The optical disc drive according to claim 1 wherein the insulating base is attached on the frame by screwing or using adhesive.

6. The optical disc drive according to claim 1 wherein the flexible cable is a flexible flat cable.

7. The optical disc drive according to claim 1 wherein the specified gap is 1.5 mm.

* * * * *